K. W. BARTLETT.
LIQUID TREATING APPARATUS.
APPLICATION FILED OCT. 23, 1911.
1,072,900.
Patented Sept. 9, 1913.
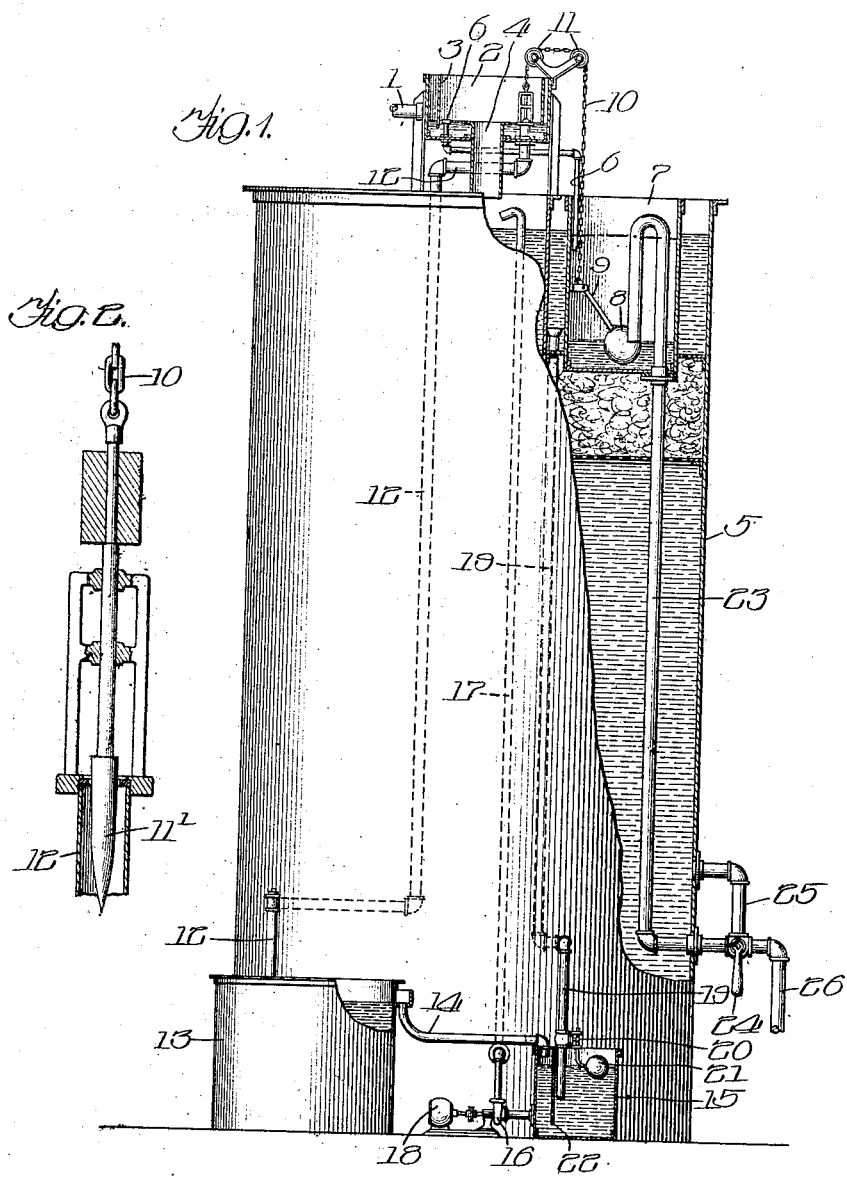
Witnesses:
Jno. H. Nelson Jr.
Edwin B. Nelson
Inventor:
Kent W. Bartlett.
By G. L. Cragg
Atty

UNITED STATES PATENT OFFICE.

KENT W. BARTLETT, OF CHICAGO, ILLINOIS.

LIQUID-TREATING APPARATUS.

1,072,900.  Specification of Letters Patent.  Patented Sept. 9, 1913.

Application filed October 23, 1911. Serial No. 656,109.

*To all whom it may concern:*

Be it known that I, KENT W. BARTLETT, a citizen of the United States, residing at Chicago, in the county of Cook and State of Illinois, have invented a certain new and useful Improvement in Liquid-Treating Apparatus, of which the following is a full, clear, concise, and exact description, reference being had to the accompanying drawings, forming a part of this specification.

My invention relates to liquid treating apparatus and, in its preferred embodiment, embraces certain of the characteristics of the apparatus disclosed in my co-pending applications Serial No. 556,514, filed June 13, 1910, and Serial No. 568,984, filed June 27, 1910, though there are characteristics of my present invention which are not to be limited to association with the aforesaid characteristics.

My invention as preferably embodied includes a source of liquid supply, a receptacle into which liquid to be treated is furnished from said source of liquid supply, a chemical tank from which liquid chemical may be passed into said receptacle and from which chemical tank chemical may be discharged in progressively increasing quantity, and means, governed by the liquid, for causing the passage of liquid into the chemical tank in progressively increasing quantity relative to the quantity of liquid passed from said source of liquid supply into said receptacle whereby the quantity of liquid chemical passing from the chemical tank increases progressively with respect to the quantity of liquid passing into said receptacle, to compensate for reduction in the strength of the liquid chemical.

While my invention is preferably embodied in an apparatus in which the liquid chemical is fed to the liquid to be treated in progressively increasing quantity, it will be apparent from the description which is to follow that my invention is of importance whether the liquid chemical is to be admitted to the liquid to be treated in progressively increasing quantity or not.

In the apparatus of my aforesaid copending application Serial No. 566,514, filed June 13, 1910, the liquid was transferred directly from the chemical tank to the receptacle or settling tank but in my present invention, as it is preferably embodied, the chemical when discharged from the chemical tank is intermixed with progressively decreasing quantity of treated liquid so that the quantity of chemical containing liquid admitted to the settling tank remains substantially constant with respect to the quantity of liquid admitted to the settling tank. By means of this feature of my invention I am enabled to employ a constant capacity pump, a centrifugal pump, for discharging chemical carrying liquid to the settling tank in an outfit where the chemical tank is disposed below the place where the chemical is to be discharged into the settling tank or other element containing the liquid undergoing treatment. The feature of my invention now being described is also of service irrespective of the uniform flow of chemical carrying liquid into the settling tank as it enables me sufficiently to dilute the chemical so as to reduce the action of the chemical upon any pump that may be employed for elevating the chemical carrying liquid in its progress toward the settling tank. While I prefer to dilute the chemical with treated liquid, I do not wish to be limited to the liquid that is employed for the purpose of diluting the chemical.

In liquid treating apparatus it is sometimes the practice to employ mechanism for governing the flow of liquid that is in turn governed by liquid which is permitted to flow within a receptacle, the liquid ultimately rising in such receptacle to a level at or beyond which the liquid will have no further governing action upon said mechanism, it thereupon being necessary sufficiently to empty the receptacle to permit the liquid to resume or continue its control over said mechanism. Hitherto it has been the practice to employ an outlet leading directly from the receptacle and through which liquid was permitted to pass when the outlet was opened by a controlling valve. It frequently happened that the valve would not be closed after the receptacle was sufficiently emptied of its liquid contents and it is one object of the present feature of my invention to provide means whereby the reception of liquid within the receptacle is assured after the receptacle is emptied so that the operation of the entire equipment may continue and will not be liable to cease absolutely. It is another object of my present invention to provide means whereby the liquid in the settling tank may be employed for effecting discharge of liquid from said receptacle at the proper time.

I will explain my invention more fully by reference to the accompanying drawing showing the preferred embodiment thereof when comprised within a water softening outfit, though I do not wish to limit my invention to apparatus that is employed for softening water.

Figure 1 of the drawing shows the preferred form of my invention in elevation, certain parts being broken away and shown in section more clearly to reveal characteristics of the invention, and Fig. 2 is a detail sectional view of the preferred form of valve mechanism entering into the construction.

Like parts are indicated by similar characters of reference in both figures.

The water that is to be treated is passed from a suitable source of supply, such as a pipe 1, into a receiving box 2 containing a stilling-plate 3 for preventing the water from surging within the box. An outlet 4 projects through the bottom of the box 2 and serves to convey the bulk of the water passing from the pipe 1 to the interior of the settling tank 5. It is understood that the settling tank is provided with an outlet, not shown, whereby the treated water may be conveyed from the tank to perform its service. It is not necessary to show the mechanism by which water is admitted to the pipe 1 to replace water removed from the settling tank as such is so well known to those skilled in the art. A portion of the water passes through a small pipe 6 into a receptacle 7 that incloses a float 8 carried upon an end of the lever 9 that is pivotally mounted between its ends. The end of the lever 9 opposite to that which carries the float 8 is connected with a chain 10 that passes over pulleys 11 and carries a tapered valve 11¹ which operates in accordance with the structure disclosed in my aforesaid copending application Serial No. 568,984, filed June 27, 1910. By means of the float and the valve the opening through which water may pass from the box 2 into a pipe 12 is progressively increased as the water continues to flow into said box and the receptacle 7. The water from the pipe 12 finds passage into a chemical tank 13 where it is thoroughly intermixed with the liquid chemical present in said tank 13, this water diluting the chemical but at the same time causing the diluted chemical to flow out of the tank 13 in progressively increasing quantity with respect to the quantity of water passing into the settling tank 5 to compensate for reduction in the strength of the liquid chemical. The liquid chemical that is discharged in progressively increasing quantity, flows from the chemical tank 13 through a discharge pipe 14, this discharge pipe conveying the chemical to a diluting tank 15 where the chemical is further diluted in order to reduce its deleterious effect upon the pump which is employed to elevate the chemical and discharge it into the settling tank, when the chemical tank is located below the point of discharge into the settling tank. Broadly speaking, water from any suitable source may be employed for further diluting the chemical, though I prefer to take the water from the settling tank as this water has been treated in such a manner as to prevent a sludge forming reaction of the chemical upon the diluting water. After the chemical has been further diluted it is elevated by means of a pump 16 through a pipe 17 that terminates at its upper end above the water in the settling tank. The pump 16, in the embodiment of the invention illustrated, is a centrifugal pump that is driven by a motor 18. The pump 16 is desirably a centrifugal pump, and in order that such a pump may be employed the volume of diluted chemical flowing through the pipe 17 is maintained constant to which end the quantity of diluting water admitted to the tank 15 is progressively decreased to the same extent that the quantity of chemical flowing through the pipe 14 is progressively increased whereby the volume of liquid to be pumped is maintained uniform, this result being of advantage whether the chemical and the diluting water are thoroughly intermixed or not, an important function of the additional water then being to maintain the volume of pumped liquid uniform. Where chemically treated water is to be employed for further diluting the chemical I desirably supply the same through a pipe 19 into whose upper end the chemically treated water is admitted from the settling tank and through whose lower end the diluting water is discharged into the tank 15. The water in the tank 15 is maintained at a substantially fixed level and is replenished as it is withdrawn from said tank as a consequence of the opening of a valve 20 in the pipe 19 that occurs each time the valve controlling float 21 connected with the valve 20 sinks upon withdrawal of the water from the tank 15.

When the operation of the apparatus is initiated the flow of chemical through the pipe 14 is at its minimum and the flow of diluting water through the pipe 19 is at its maximum. As the flow of chemical through the pipe 14 increases the flow of diluting water through the pipe 19 decreases correspondingly, the result being that the liquid load for the centrifugal pump 16 is made uniform, thus enabling the employment of such a pump. It is of course understood that the settling tank outlet is located above the filter chamber, in accordance with well known practice, whereby it is impossible for the level of the water in the settling tank to be lower than the upper end of the pipe 19, the size of the outlet pipe and its flange connection with the settling tank being such as to cause the location of this pipe to be above the top of the pipe 19. It is the practice to cause the water to flow into the pipe 1 as soon as it flows out of the settling tank so that the level in the settling tank would always be above the top of the pipe 19 irrespective of the location of the outlet pipe.

The stilling-plate 22, within the tank 15, is disposed between the discharge ends of the pipes 14 and 19, the pump being in direct communication with the portion of the tank 15 into which the chemical is directly discharged so that the passage of the required amount of chemical to the settling tank 5 through the pipe 17 is assured.

When the maximum flow of chemical through the pipe 14 has occurred the level of the water in the receptacle 7 is at its maximum height as indicated by the dotted line, this level being below the bight at the upper part of the siphon pipe 23. When the level in the receptacle 7 reaches this point an attendant, by observation or some other way, becomes aware of the fact and turns the valve handle 24 of a three way valve a quarter turn to the left from the position shown so that water may flow from the settling tank through the pipe 25 and upwardly into the longer leg of the pipe 23 so that a column of water is established in this long leg that overbalances the column of water in the short leg of the siphon whereupon the operator restores the handle 24 to the position shown so that an outlet is established from the siphon pipe by way of the discharge branch pipe 26, the pipe 25 then having its communication with the pipe 23 cut off. When the level in the receptacle 7 has been brought in line with the lower end of the short leg of the siphon pipe, flow of water through the outlet 26 from the receptacle 7 ceases, the air entering the siphon pipe 23 at the short leg thereof breaking siphonic action so that the longer leg of the siphon pipe is emptied. The water, in the next cycle of operation, will rise in the receptacle 7 to its upper limit whereupon the receptacle 7 will again be emptied, all in a manner which has been described. It will be observed that the pressure of the water in the tank 5 is employed to establish the column of water in the longer leg of the siphon 23 that is necessary to start the siphon in operation in order to empty the receptacle 7 and while the pressure of the water is employed to initiate the siphonic action, I do not wish to be limited to the means through which the water in the settling tank operates to effect discharge of water from the receptacle 7.

From the foregoing description of my invention it will be apparent that that feature of my invention which is of service in reducing deleterious action of the chemical upon the pump is of service whether liquid chemical is passed from the chemical tank in progressively increasing quantity or not. It will also be apparent that my invention is of service in the dilution of liquid chemical that is passed from the chemical tank in varying quantities, whether such variation is one in which the discharge of chemical is in progressively increasing quantity or not. The drawing illustrates an outlet 4 which serves to convey the water to be treated directly to the settling tank so that the raw water does not pass through the pump 16. It is old to employ a pump that effects the passage of water to be treated to the settling tank, to which water chemical is admitted before it reaches the pump. The pump thus forces partially treated water into the settling tank, the water in this condition containing sludge that interferes with the proper action of the pump. I therefore do not limit myself to an outfit in which the chemical is discharged from the chemical tank in progressively increasing quantity nor to the pumping of a uniform quantity of liquid that contains the discharged chemical nor to the dilution of the liquid chemical by the treated liquid.

While I have herein shown and particularly described the preferred embodiment of my invention as employed in a water softening outfit, I do not wish to be limited to the precise construction and specific adaptation of my invention herein specifically set forth, but

Having thus described my invention, I claim as new and desire to secure by Letters Patent the following:—

1. A liquid treating apparatus including a tank for receiving liquid furnished for treatment; a chemical tank; means for proportioning chemical to the liquid to be treated thereby; a pump for forcing chemical, discharged from the chemical tank and after it has been proportioned to the liquid to be treated thereby, to the liquid receiving tank; means for supplying a portion of the liquid, after its treatment by the chemical, to the proportioned chemical being admitted to the pump; and means for discharging the liquid that is to be treated into the tank for receiving the same independently of the pump.

2. A liquid treating apparatus including a tank for receiving the liquid furnished for treatment; a chemical tank from which chemical may be discharged in changing quantity; a pump for forcing chemical discharged from the chemical tank to the liquid receiving tank; and means for supplying additional liquid to the chemical being admitted to the pump from the chemical tank, said means including mechanism for altering the quantity of added liquid to render the aggregate quantity of chemical and added liquid whose passage is forced by the pump substantially constant.

3. A liquid treating apparatus including a tank for receiving the liquid furnished for treatment; a chemical tank from which chemical may be discharged in changing quantity; a pump for forcing chemical discharged from the chemical tank to the liquid receiving tank; and means for supplying a portion of the liquid that has been treated to the chemical being admitted to the pump from the chemical tank, said means including mechanism for altering the quantity of added liquid to render the aggregate quantity of chemical and added liquid whose passage is forced by the pump substantially constant.

4. A liquid treating apparatus including a tank for receiving the liquid furnished for treatment; a chemical tank from which chemical may be discharged in changing quantity; a pump for forcing chemical discharged from the chemical tank to the liquid receiving tank; and means for supplying additional liquid to the chemical being admitted to the pump from the chemical tank, said means including mechanism governed by the aggregate volume of chemical and added liquid automatically to control the amount of added liquid to render the volume of chemical and added liquid forced by the pump substantially constant.

5. A liquid treating apparatus including a tank for receiving the liquid furnished for treatment; a chemical tank from which chemical may be discharged in changing quantity; a pump for forcing chemical discharged from the chemical tank to the liquid receiving tank; and means for supplying a portion of the liquid that has been treated to the chemical being admitted to the pump from the chemical tank, said means including mechanism governed by the aggregate volume of chemical and added liquid automatically to control the amount of added liquid to render the volume of chemical and added liquid forced by the pump substantially constant.

6. A liquid treating apparatus including a chemical tank from which chemical may be discharged into liquid to be treated; mechanism for governing the flow of chemical from said chemical tank to said liquid; a receptacle in which liquid is received in proportion to that which is supplied for treatment; mechanism for governing the operation of the aforesaid mechanism and in turn operated by the liquid as it rises in the receptacle; and means for discharging liquid from said receptacle, said means being automatically governed by the liquid in the receptacle to cut off the flow of liquid from the receptacle when liquid within the receptacle has reached a lower limiting level.

7. A liquid treating apparatus including a chemical tank from which chemical may be discharged into liquid to be treated; mechanism for governing the flow of chemical from said chemical tank to said liquid; a receptacle in which liquid is received in proportion to that which is supplied for treatment; mechanism for governing the operation of the aforesaid mechanism and in turn operated by the liquid as it rises in the receptacle; and a siphon having one leg receiving liquid from the receptacle and the other leg communicating with the exterior of the receptacle to permit of the discharge of liquid from said receptacle.

8. A liquid treating apparatus including a chemical tank from which chemical may be discharged into liquid to be treated; mechanism for governing the flow of chemical from said chemical tank to said liquid; a receptacle in which liquid is received in proportion to that which is supplied for treatment; mechanism for governing the operation of the aforesaid mechanism and in turn operated by the liquid in the receptacle; a siphon having one leg receiving liquid from the receptacle and the other leg communicating with the exterior of the receptacle to permit of the discharge of liquid from said receptacle; and means, other than said receptacle, for supplying liquid to the latter siphon leg to start the siphon in action.

9. A liquid treating apparatus including a chemical tank from which chemical may be discharged into liquid to be treated; mechanism for governing the flow of chemical from said chemical tank to said liquid; a receptacle in which liquid is received in proportion to that which is supplied for treatment; mechanism for governing the operation of the aforesaid mechanism and in turn operated by the liquid in the receptacle; a siphon having one leg receiving liquid from the receptacle and the other leg communicating with the exterior of the receptacle to permit of the discharge of liquid from said receptacle; means, other than said receptacle, for supplying liquid to the latter siphon leg to start the siphon in action; and valving mechanism for controlling the connection of the latter siphon leg with the extra liquid supply.

10. A liquid treating apparatus including a tank for receiving liquid furnished for treatment; a chemical tank; means for proportioning chemical to the liquid to be treated thereby; a pump for forcing chemical, discharged from the chemical tank and after it has been proportioned to the liquid to be treated thereby, to the liquid receiving tank; and means for supplying a portion of the liquid, after its treatment by the chemical, to the proportioned chemical being admitted to the pump.

In witness whereof, I hereunto subscribe my name this twentieth day of October, A. D. 1911.

KENT W. BARTLETT.

Witnesses:
E. L. WHITE,
G. L. CRAGG.